United States Patent [19]

Baker et al.

[11] 4,438,584
[45] Mar. 27, 1984

[54] TRAP FOR RATS, MICE, AND OTHER VERMIN

[75] Inventors: Stanley Z. Baker, Mayfield Heights; Benjamin H. Baker, Chesterland, both of Ohio

[73] Assignee: J. T. Eaton & Company, Inc., Twinsburg, Ohio

[21] Appl. No.: 338,621

[22] Filed: Jan. 11, 1982

Related U.S. Application Data

[63] Continuation of Ser. No. 53,381, Jun. 29, 1979, abandoned.

[51] Int. Cl.³ .......................................... A01M 23/00
[52] U.S. Cl. .......................................... 43/58; 43/114
[58] Field of Search .......................... 43/58, 114–116; 424/77; 229/2.5 R

[56] References Cited

U.S. PATENT DOCUMENTS

| | | |
|---|---|---|
| 476,087 | 5/1892 | Smith . |
| 671,961 | 4/1901 | Heinritz . |
| 713,388 | 11/1902 | Bierley . |
| 731,843 | 6/1903 | Bierley . |
| 740,870 | 10/1903 | Jones . |
| 813,196 | 2/1906 | Bien . |
| 1,386,922 | 8/1921 | Caloui . |
| 1,545,005 | 7/1925 | Meyer . |
| 1,624,089 | 4/1927 | Biddle . |
| 2,138,926 | 12/1938 | Karfiol .............................. 43/114 |
| 2,264,875 | 12/1941 | Greuling ............................ 43/114 |
| 2,535,209 | 12/1950 | Hubert ............................... 167/49 |
| 2,911,756 | 11/1959 | Geary ................................. 43/114 |
| 2,962,836 | 12/1960 | Hughes ................................ 43/58 |
| 3,023,539 | 3/1962 | Emerson, Jr. ...................... 43/113 |
| 3,511,433 | 3/1968 | Andrews et al. ................... 229/44 |
| 3,605,374 | 9/1971 | Mueller et al. ................. 229/2.5 R |
| 3,729,858 | 5/1973 | Bradshaw ........................... 43/114 |
| 3,864,866 | 2/1975 | Kosinsky ............................. 43/58 |
| 3,940,374 | 3/1976 | Katsuda .............................. 43/114 |
| 4,044,495 | 8/1977 | Nishimura et al. ................ 43/121 |

FOREIGN PATENT DOCUMENTS 581474 11/1946 United Kingdom .
615302 1/1949 United Kingdom .

OTHER PUBLICATIONS

Magazine Article, Pest Control Technology, Glue Traps for Rodents, Broome, Oct. 1977; p. 32 of Pest Control Magazine dated Sep. 24, 1976; similar ad in 1974 issue of Pest Control Magazine.

Primary Examiner—Nicholas P. Godici
Assistant Examiner—Charles L. Willis
Attorney, Agent, or Firm—Body, Vickers & Daniels

[57] ABSTRACT

A non-toxic adhesive trap for mice and insects using a pressure sensitive adhesive which is insensitive to normal heat variations in a room and will not bleed onto adjacent surfaces. A non-porous plastic tray has a central indentation into which molten material is poured which then thickens to provide a tacky layer which will trap, by self-adhesion, any vermin coming into contact therewith.

4 Claims, 4 Drawing Figures

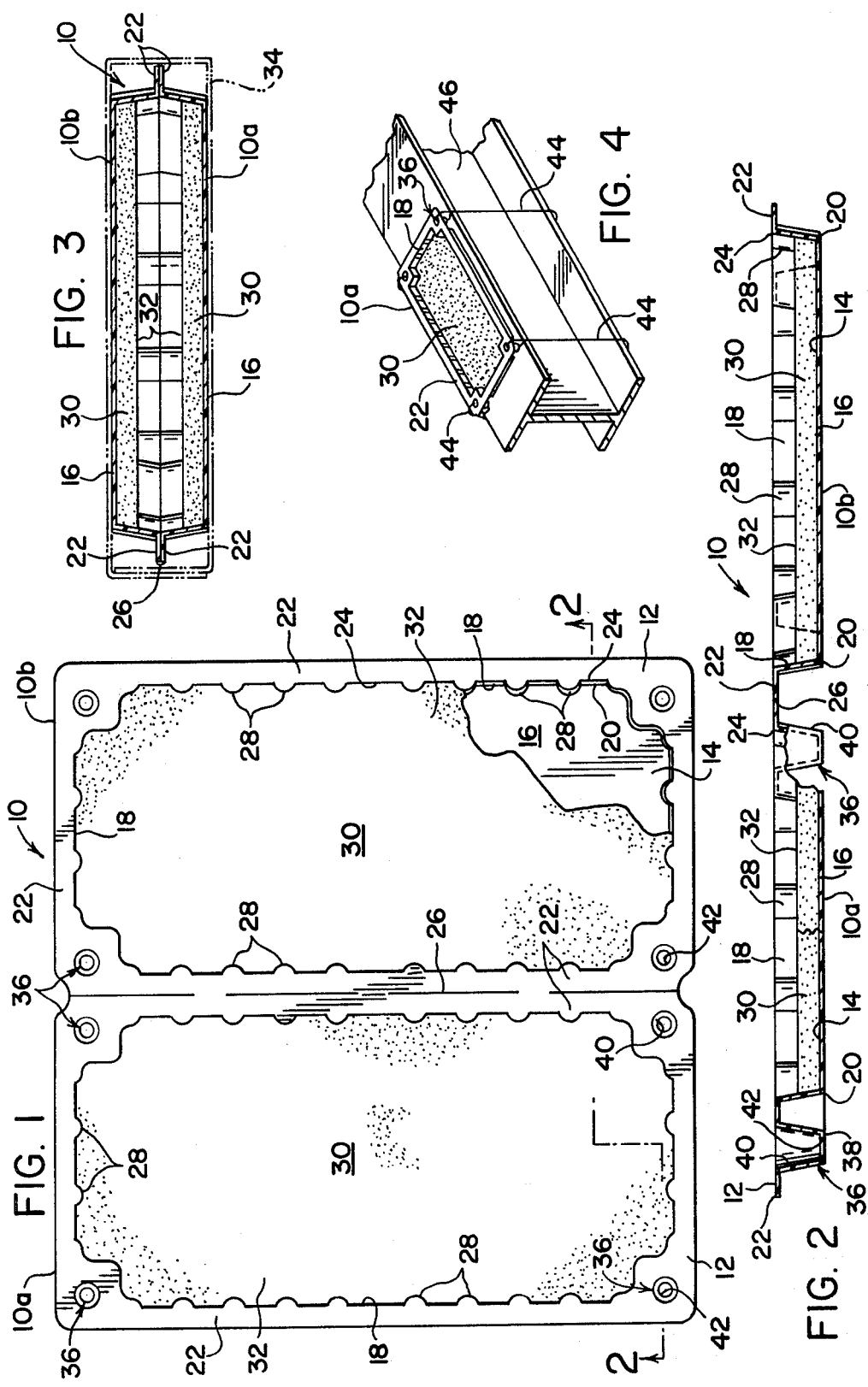

TRAP FOR RATS, MICE, AND OTHER VERMIN

This is a continuation of application Ser. No. 53,381 filed June 29, 1979 now abandoned.

BACKGROUND OF THE INVENTION

This invention relates to the art of traps for rats, mice, and other vermin and, more particularly, to a trap using a pressure sensitive adhesive to which the vermin stick upon coming into contact therewith.

Adhesive substances have been used heretofore for trapping vermin, specifically mice, by coating an adhesive substance onto a paper or cardboard backing which is then positioned in or around the runways where the vermin tend to move such that when they come into contact therewith, they are unable to extricate themselves and will either die or may be killed and then disposed of. Heretofore, the adhesive substances used have been either an unhardened glue, a sticky rosin material, or a plastic containing large amounts of a plasticizer. Such materials are characteristically in a semi-liquid state at normal ambient temperatures, preferably from 50° to 100° F. Heretofore, such materials have presented problems due to the fact that often times, for example when the coated paper or cardboard backing is placed in remote places within a building, the temperatures are substantially elevated to a point where the adhesive substance melts and flows onto surrounding surfaces damaging or staining same, sometimes very seriously. Additionally, such materials normally contain oils which can bleed through the paper or cardboard backing onto surrounding surfaces or from a shipping package also causing damage to surrounding areas. In addition, when such materials are heated to higher temperatures, they become less viscous with the result that mice or vermin coming into contact therewith are sometimes able to extricate themselves.

SUMMARY OF THE INVENTION

The present invention provides an improved trap for vermin and the like which uses a pressure sensitive adhesive to retain mice or other vermin once they have come into contact therewith which overcomes the above referred to difficulties and provides a trap which will retain the adhesive substance even if it should melt, and prevents bleeding of the ingredients of the adhesive onto surrounding surfaces.

In accordance with the present invention, a generally flat tray is provided from a non-porous plastic material and having at least one large central indentation into which a substantial thickness (less than the depth of the indentation) of a melted pressure sensitive adhesive is deposited and then allowed to cool. In one embodiment of the invention, the trays are genenerally rectangular with a flat flange surrounding each indentation and adjacent edges of the flanges are joined by a flexible connection such that the trays can be folded with the indentations facing each other and with the flanges in abutment, all for ease of shipment. In addition, the flexible connection may be perforated so that the trays may be easily separated and used independently.

The pressure sensitive material is preferably one having a melting temperature substantially above the maximum ambient temperature to be expected, e.g., 250° F., but which remains tacky down to and below freezing temperatures, e.g., 20° F. In addition, the thickness of the adhesive material in the indentation has a thickness of between ⅛ and ¼ inch.

Further in accordance with the invention, the flanges of the tray, preferably at the corners if rectangular, are provided with perforations or the like through which tie members or fasteners can extend for the purpose of fixedly locating the trays in any desired location where the vermin are likely to be ambulatory.

OBJECTS

The principal object of the invention is the provision of a new and improved adhesive trap for rats, mice, and other vermin wherein a substantial thickness of adhesive material may be employed without danger of having the material melt and flow onto adjacent surfaces where the trap is placed.

Another object of the invention is the provision of a new and improved adhesive trap for rats, mice and other vermin wherein the adhesive material is placed in a non-porous plastic tray so that bleeding of ingredients in the adhesive material through the container therefor will not occur.

Another object of the invention is the provision of a new and improved adhesive trap for rats, mice and other vermin wherein the trays for holding the adhesive material are so designed and arranged that the trays themselves may be placed in facing relationship and form the shipping package.

Another object of the invention is the provision of a new and improved tray for retaining adhesive material for an adhesive vermin trap having improved means for enabling the tray to be tied or otherwise fastened to surrounding surfaces.

BRIEF DESCRIPTION OF THE DRAWINGS

The invention may take physical form in a variety of parts and arrangements of parts, a preferred embodiment of which will be described in the following detailed description and illustrated in the accompanying drawings which form a part hereof and wherein:

FIG. 1 is a top plan view of an assembly of traps illustrating a preferred embodiment of the present invention;

FIG. 2 is a cross-sectional view of FIG. 1 taken on line 2—2 and illustrating quantities of pressure sensitive adhesive material deposited in the assembly of traps in accordance with the objects of the present invention;

FIG. 3 is a cross-sectional view of the assembly of traps of this invention, folded and packaged for shipping or storage; and, FIG. 4 is a top plan view of a trap according to the present invention arranged for use in the environment of a suspended beam to restrain mice, rats, or other vermin.

PREFERRED EMBODIMENT

Referring now to the drawings wherein the showings are for the purpose of illustrating a preferred embodiment of the invention only and not for the purposes of limiting same, FIG. 1 shows an assembly of traps, generally indicated by reference numeral 10, constructed in accordance with the present invention. The assembly of traps 10 includes a first trap portion 10a and a second trap portion 10b. Each trap portion 10a, 10b includes a generally flat tray 12 composed of a non-porous, thin sheet material shaped to include an indented portion 14. The material of which trays 12 are composed is preferably a polymeric substance such as polyvinyl chloride, polystyrene, or polyethelane. The tray material is initially provided in the form of a sheet with sufficient dimensions for trays 12 of a desired size and shape. The polymeric sheet is preferably shaped by a process of heating and then vacuum forming or stamping.

Each trap portion, 10a or 10 b, includes a generally planar bottom 16 and generally vertical side walls 18. While the indented portion 14 may have any shape desired, the trap portions shown in FIG. 1 have indented portions 14 of generally rectangular shape. Side walls 18 are formed integral with planar bottom 16 at a bottom edge 20 of each of the side walls.

A flange 22 entirely surrounds indented portion 14 and is integrally formed with the indented portion and connected at an upper edge 24 of the side walls. Flange 22 may be, and preferably is, a unitary planar surface connecting two or more trap portions such as first trap portion 10a and second trap portion 10b. Further, at least the center line 26 of the flange area common to two adjacent trap portions is flexible so that one trap portion can be folded over the other trap portion with the flanges abutting. The traps can then be stored or shipped without the need for further protection. This line 26 is also preferably perforated so that the trap portions may be readily separated.

Side walls 18 of indented portions 14 include a plurality of ribs 28 extending generally vertically from bottom edge 20 at planar bottom 16 to upper edge 24 at flange 22. Ribs 28 are provided for the purpose of strengthening tray 12 and preventing bending of tray assembly 10 during handling or deployment.

A quantity of pressure sensitive adhesive material 30 is deposited within indented portion 14. Such material, in accordance with the invention, has a plastic flow temperature at least above the highest ambient temperature to be expected, e.g., 120° F., and a melting temperature even higher, e.g., 200° F. to 250° F. Its surface remains pressure sensitive adhesive to about 20° F. This material is heated to the flow temperature, pumped or poured into the indentation and allowed to cool. When the adhesive material cools, a semi-solid state is reattained and the material is fixed within the indented portion 14. A normal room temperatures therefore, the adhesive material 30 is in a semi-solid state with a surface very sticky to any surface pressed thereagainst, even light pressure. Material 30 is deposited within indented portion 14 in a quantity resulting in an upper surface 32 of the pressure sensitive adhesive material being below flange 22. Preferably, adhesive material 30 is provided within indented portion 14 to a level extending intermediate bottom edge 20 and upper edge 24 of side walls 18 preferably to a depth of at least 1/16 inch and not more than ⅛ inch.

Use of the present invention may involve either trap assembly 10, combined, or first and second trap portions 10a and 10b, individually. Separation of the first and second trap portions is accomplished by cutting or breaking flange 22 at perforated line 26. In either case, the trap is used by positioning assembly 10 or trap portion 10a or 10b in an area normally traversed by the vermin intended to be eliminated. As an example, the trap may be positioned on floors, under furniture or structures, in furniture or structures, within or withon building components.

As a result of the application of pressure sensitive adhesive material 30 in a liquid state, it is important that tray 12 be constructed of material which is non-porous. Any degree or porosity results in the liquefied material bleeding through tray 12 during manufacture and/or possibly during storage or shipment. Additional advantage is gained from the use of a non-porous material in the construction of tray 12 in that if the temperature in the immediate environment of trap assembly 10 should rise above the softening point of the material, indented portion 14 will positively contain same. Further precautions need not be taken to prevent pressure sensitive adhesive material 30 from "bleeding" through tray 12 and staining articles immediately surrounding the environment of the trap assembly 10. Even when trap assembly 10 is used on or near furniture or furnishings, the non-porosity of the tray material prevents staining of cloth, paper or furniture by the pressure sensitive adhesive material should the temperature reach a level capable of causing pressure sensitive adhesive 30 to attain a flowable plastic state.

When trap portion 10a or 10b has been positioned within a run or path generally used by the vermin intended to be captured, pressure sensitive adhesive material 30 restrains the vermin from leaving the trap once any portion of the vermin has contacted the pressure sensitive adhesive material. One characteristic of pressure sensitive adhesive material involves the increase in holding strength proportional to forces directed thereagainst. In this respect, struggling efforts of a restrained vermin result in pressure sensitive adhesive material 30 obtaining a stronger hold on the vermin.

Trap assembly 10 provides an additional advantage in that the assembly effectively operates as a convenient shipping container for the traps. FIG. 3 illustrates trap assembly 10 having second trap portion 10b folded over first trap portion 10a. Folding of the trap portions, one onto another, is easily accomplished as a result of perforated line 26 within flange 22. Tray 12 provides an integral cover for pressure sensitive adhesive material 30 during shipping and/or storage. Tray 12 prevents dirt or articles from engaging upper surface 32 of the pressure sensitive adhesive material. Trap assembly 10, in the folded condition illustrated in FIG. 3, is preferably placed within packaging material 34 for storage and/or shipping. Packaging material 34 includes, for example, cardboard, paper wrapping, sheet plastic, and plastic or paper bags.

Flange 22 may be, and preferably is, provided with minor indentations 36 near each corner of indented portion 14 as shown in FIG. 2. These indentations 36 extend from flange 22 in the same direction as indented portion 14 to a level equal to planar bottom 16 of the indented portion. Each indentation 36 includes a bottom 38 and side walls 40. An aperture 42 is provided in bottom 38 of each minor indentation 36. When either a trap assembly 10 or individual trap portions 10a or 10b are used on raised surfaces, indentations 36 are used to secure the trap to the raised surface by providing wires or strings 44 through apertures 42 and around or to the raised structure, such as beam 46, as shown in FIG. 4. Minor indentations 36 provide support at a point at which the trap is tied through aperture 42 to the raised structure. Securing the trap to the raised structure assures that the trap will not fall from the surface as a result of unintentional movement of the trap or actions of a restrained vermin.

The invention has been described with reference to the preferred embodiment. Obviously, modifications and alterations will occur to others upon the reading and understanding of the specification. It is intended to include all such modifications and alterations insofar as they come within the scope of the appended claims or the equivalents thereof.

Having thus described my invention, I claim:

1. A trap for vermin comprised of a generally flat support formed of a non-porous, thin sheet material, said support having at least one positioning surface, at least one indented portion having a given depth below said positioning surface, and a relatively thick layer of pressure sensitive adhesive material contained within said indented portion having a thickness of at least 1/16 inch, a plastic flow temperature above 120° F. and an upper surface; said indented portion having a greater depth than the thickness of said layer of adhesive and said positioning surface being spaced above said adhesive layer upper surface.

2. A trap according to claim 1 wherein said indented portion has a planar bottom and said positioning surface is a flat flange extending completely around said indented portion.

3. A trap according to claim 1 wherein said support includes at least two indented portions and a flat flange between said portions.

4. A trap according to claim 1 wherein said support has two spaced indented portions and includes a flat flange extending completely around said two indented portions, and said flange having a perforated margin symmetrically between said two indented portions.

* * * * *

REEXAMINATION CERTIFICATE (301st)
United States Patent [19]
Baker et al.

[11] B1 4,438,584
[45] Certificate Issued  Feb. 5, 1985

[54] TRAP FOR RATS, MICE AND OTHER VERMIN

[75] Inventors: Stanley Z. Baker, Mayfield Heights; Benjamin H. Baker, Chesterland, both of Ohio

[73] Assignee: J. T. Eaton & Company, Inc., Twinsburg, Ohio

Reexamination Request:
No. 90/000,558, May 18, 1984

Reexamination Certificate for:
Patent No.: 4,438,584
Issued: Mar. 27, 1984
Appl. No.: 338,621
Filed: Jan. 11, 1982

Related U.S. Application Data

[63] Continuation of Ser. No. 53,381, Jun. 29, 1979, abandoned.

[51] Int. Cl.³ .............................................. A01M 23/00
[52] U.S. Cl. ............................................. 43/58; 43/114
[58] Field of Search .......................... 43/58, 114–116; 424/77; 229/2.5 R

[56]  References Cited
PUBLICATIONS

"Pest Control Technology" magazine, Jun. 1978 issue, p. 29.
"Pest Control" magazine, Jun. 1978 issue, p.43.

*Primary Examiner*—Nicholas P. Godici

[57] ABSTRACT

A non-toxic adhesive trap for mice and insects using a pressure sensitive adhesive which is insensitive to normal heat variations in a room and will not bleed onto adjacent surfaces. A non-porous plastic tray has a central indentation into which molten material is poured which then thickens to provide a tacky layer which will trap, by self-adhesion, any vermin coming into contact therewith.

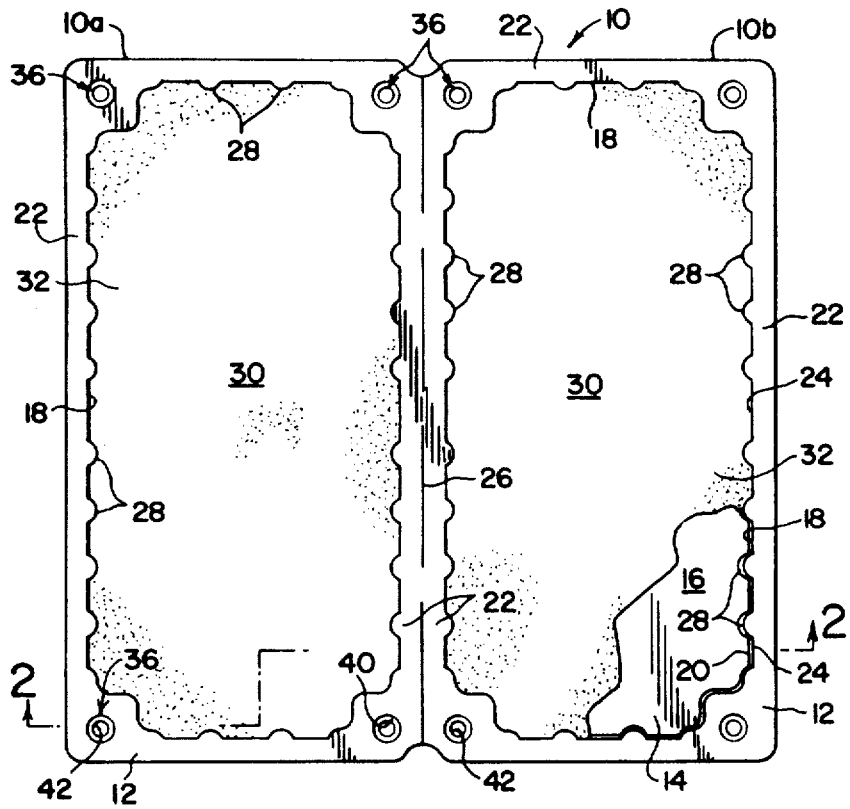

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-4 is confirmed.

* * * * *

REEXAMINATION CERTIFICATE (673rd)
United States Patent [19]
Baker et al.

[11] B1 4,438,584
[45] Certificate Issued  Apr. 28, 1987

[54] TRAP FOR RATS, MICE, AND OTHER VERMIN

[75] Inventors: Stanley Z. Baker, Mayfield Heights; Benjamin H. Baker, Chesterland, both of Ohio

[73] Assignee: J. T. Eaton & Company, Inc., Twinsburg, Ohio

Reexamination Request:
No. 90/000,827, Jul. 25, 1985

Reexamination Certificate for:
Patent No.: 4,438,584
Issued: Mar. 27, 1984
Appl. No.: 338,621
Filed: Jan. 11, 1982

Related U.S. Application Data

[63] Continuation of Ser. No. 53,381, Jun. 29, 1979, abandoned.

[51] Int. Cl.$^4$ ............................................. A01M 23/00
[52] U.S. Cl. ........................................... 43/58; 43/114
[58] Field of Search ................................... 43/58, 114

[56] References Cited

U.S. PATENT DOCUMENTS

| | | |
|---|---|---|
| 2,214,326 | 9/1942 | Gregory . |
| 2,258,683 | 10/1941 | Ketterer .............................. 43/114 |
| 4,156,321 | 5/1979 | Capizzi et al. . |
| 4,244,134 | 1/1981 | Otterson ............................. 43/58 |

FOREIGN PATENT DOCUMENTS

| | | |
|---|---|---|
| 572572 | 10/1945 | United Kingdom . |
| 572826 | 10/1945 | United Kingdom . |
| 572994 | 11/1945 | United Kingdom . |
| 581474 | 10/1946 | United Kingdom . |

OTHER PUBLICATIONS

"Trap Stik" Label and Directions for use.
"Pest Control Magazine", Jun. 1978, p. 43.
"Pest Control Technology Magazine", Jun. 1978, p. 29.
*The Rat: a World Menace,* by Horder (1929), pp. 60–61.
*Rats and How to Destroy Them,* by Hovell (1924), p. 198.
National Pest Control Association Technical Release No. 8-58, May 1958, pp. 1–12 and 20–23.

*Primary Examiner*—Nicholas P. Godici

[57] ABSTRACT

A non-toxic adhesive trap for mice and insects using a pressure sensitive adhesive which is insensitive to normal heat variations in a room and will not bleed onto adjacent surfaces. A non-porous plastic tray has a central indentation into which molten material is poured which then thickens to provide a tacky layer which will trap, by self-adhesion, any vermin coming into contact therewith.

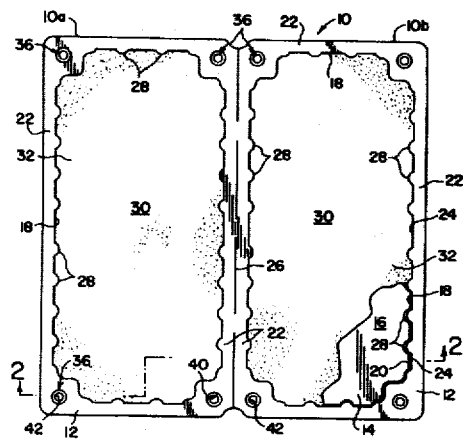

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-4, dependent on an amended claim, are determined to be patentable.

1. A *commercial* trap *product* for [vermin] *catching mice or rats* comprised of a generally flat support formed of a non-porous, thin sheet material, said support having at least one positioning surface, at least one indented portion having a given depth below said positioning surface, and a relatively thick layer of pressure sensitive adhesive material contained within said indented portion having a thickness of at least 1/16 inch, a plastic flow temperature above 120° F. and an upper surface; said indented portion having a greater depth than the thickness of said layer of adhesive and said positioning surface being spaced above said adhesive layer upper surface.

* * * * *